US012664004B2

(12) United States Patent
Kesterson et al.

(10) Patent No.: US 12,664,004 B2
(45) Date of Patent: Jun. 23, 2026

(54) ASYNCHRONOUS FINITE STATE MACHINE CIRCUIT

(71) Applicant: Renesas Design (UK) Limited, Bourne End (GB)

(72) Inventors: John William Kesterson, Central Point, OR (US); David Lloyd, Bristol (GB); James Crawford Steele, Chandler, AZ (US); Robert Waterworth, Bristol (GB); Danil Sokolov, Newcastle Upon Tyne (GB)

(73) Assignee: Renesas Design (UK) Limited, Bourne End (GB)

( * ) Notice: Subject to any disclaimer, the term of this patent is extended or adjusted under 35 U.S.C. 154(b) by 251 days.

(21) Appl. No.: 18/307,949

(22) Filed: Apr. 27, 2023

(65) Prior Publication Data

US 2024/0362035 A1 Oct. 31, 2024

(51) Int. Cl.
*G06F 9/448* (2018.01)

(52) U.S. Cl.
CPC .................................. *G06F 9/4498* (2018.02)

(58) Field of Classification Search
CPC .................................................... G06F 9/4498
See application file for complete search history.

(56) References Cited

U.S. PATENT DOCUMENTS

| | | | | |
|---|---|---|---|---|
| 4,740,891 A | * | 4/1988 | Kirkpatrick | G05B 19/045 700/12 |
| 5,389,838 A | * | 2/1995 | Orengo | G06F 1/04 326/46 |

| | | | | |
|---|---|---|---|---|
| 5,694,327 A | * | 12/1997 | Schurig | G06F 7/00 700/19 |
| 8,194,790 B2 | * | 6/2012 | Pontius | G06F 13/4072 375/370 |
| 8,693,607 B1 | * | 4/2014 | Schober | G04F 10/02 370/304 |
| 10,581,435 B1 | * | 3/2020 | Sokolov | H03K 19/20 |
| 10,790,742 B1 | * | 9/2020 | Petersen | H02M 3/07 |
| 2007/0262786 A1 | * | 11/2007 | Manohar | H03K 19/007 326/14 |
| 2009/0115488 A1 | * | 5/2009 | Cortadella | G06F 30/327 327/365 |

(Continued)

FOREIGN PATENT DOCUMENTS

| | | | | | |
|---|---|---|---|---|---|
| CN | 105320008 A | * | 2/2016 | | G06F 13/14 |
| CN | 118868870 A | * | 10/2024 | | G06F 9/4498 |

(Continued)

OTHER PUBLICATIONS

"Hierarchical design of a realistic buck controller", 7 pages, retrieved on Mar. 2, 2023 from Internet: <https://workcraft.org/tutorial/design/hierarchical_buck/start>.

(Continued)

*Primary Examiner* — Seokjin Kim
(74) *Attorney, Agent, or Firm* — SCULLY, SCOTT, MURPHY & PRESSER, P.C.

(57) ABSTRACT

An asynchronous finite state machine circuit comprising state circuitry configured to be in one of a plurality of states, and transition between states, wherein the asynchronous finite state machine is configured to detect that a current state is stable before the state circuitry can transition to a next state.

24 Claims, 15 Drawing Sheets

(56) References Cited

U.S. PATENT DOCUMENTS

| | | | | |
|---|---|---|---|---|
| 2014/0241443 A1* | 8/2014 | Nowick | ................. | G06F 13/14 |
| | | | | 375/259 |
| 2014/0281086 A1* | 9/2014 | Bacigalupo | ............ | G06F 13/14 |
| | | | | 710/240 |
| 2019/0130948 A1* | 5/2019 | Choi | .................... | G11C 11/419 |
| 2022/0360159 A1* | 11/2022 | Stockstad | ............... | H02J 7/345 |
| 2023/0129868 A1* | 4/2023 | Tripodi | ..................... | G06F 1/04 |
| | | | | 713/502 |
| 2024/0303092 A1* | 9/2024 | Chesneau | ............ | G06F 9/4498 |

FOREIGN PATENT DOCUMENTS

| | | | | | | |
|---|---|---|---|---|---|---|
| GB | 2508162 A | * | 5/2014 | ......... | G06F 15/7867 |
| WO | WO-2007127917 A2 | * | 11/2007 | ......... | G11C 11/4125 |

OTHER PUBLICATIONS

"Analog-to-asynchronous element", 7 pages, retrieved on Mar. 2, 2023 from Internet: <https://www.workcraft.org/a2a/start>.

Khomenko et al., "WAITX: An Arbiter for Non-Persistent Signals", Published on May 21, 2017, 8 pages.

"Quasi-delay-insensitive circuit", Wikipedia, 8 pages, retrieved on Mar. 2, 2023 from Internet: <https://en.wikipedia.org/wiki/Quasi-delay-insensitive_circuit>.

"Signal transition graphs", Wikipedia, 8 pages, retrieved on Mar. 2, 2023 from Internet: <https://en.wikipedia.org/wiki/Signal_transition_graphs>.

"Circuit synthesis", 2 pages, retrieved on Mar. 2, 2023 from Internet: <www.workcraft.org/help/synthesis>.

Golubcovs, "Multi-resource Approach to Asynchronous SoC: Design and Tool Support", Newcastle University: Technical Report Series, 155 pages, Dec. 2011.

"C-element", Wikipedia, 8 pages, retrieved on Mar. 2, 2023 from Internet: <https://en.wikipedia.org/wiki/C-element>.

"Finite-state machine", Wikipedia, 12 pages, retrieved on Mar. 2, 2023 from Internet: <https://en.wikipedia.org/wiki/Finite-state_machine>.

"Asynchronous circuit", Wikipedia, 15 pages, retrieved on Mar. 2, 2023 from Internet: <https://en.wikipedia.org/wiki/Asynchronous_circuit>.

"Flip-flop (electronics)", Wikipedia, 21 pages, retrieved on Mar. 2, 2023 from Internet: <https://en.wikipedia.org/wiki/Flip-flop_(electronics)>.

Golubcovs et al., "Asynchronous circuit development with Workcraft", Newcastle University: Technical Report Series, 16 pages, Dec. 2011.

"Asynchronous Sequential Circuits", 11 pages, retrieved on Mar. 2, 2023 from Internet: <https://www.ee.ucl.ac.uk/~ademosth/E757/Topic6.pdf>.

* cited by examiner

ASYNCHRONOUS FINITE STATE MACHINE CIRCUIT

The present disclosure relates to an asynchronous finite state machine circuit. In particular, the present disclosure relates to a finite state machine comprising state circuitry.

BACKGROUND

A finite state machine (FSM) is a circuit that can be in one of several states. This may be based on the inputs it receives and, for a synchronous FSM, the state transitions may be controlled by a clock signal.

An asynchronous circuit is a circuit that does not require a clock signal for the synchronisation of its operation, and may be contrasted with synchronous circuits. Asynchronous circuits can operate quicker and more efficiently than corresponding synchronous circuits.

SUMMARY

It is desirable to provide an asynchronous finite state machine.

According to a first aspect of the disclosure there is provided an asynchronous finite state machine circuit comprising state circuitry configured to be in one of a plurality of states, and transition between states, wherein the asynchronous finite state machine is configured to detect that a current state is stable before the state circuitry can transition to a next state.

Optionally, the state circuitry is configured to provide one or more output signals that are dependent on the state of the state circuitry.

Optionally, the state circuitry comprises one or more state bits, and each of the one or more state bits is configured to be in one of a plurality of bit states, the state of the state circuitry being dependent on the bit states of the one or more state bits.

Optionally, the one or more state bits are each configured to provide an output signal that is dependent on its bit state.

Optionally, at least one of the one or more state bits comprises a flip flop.

Optionally, the asynchronous circuit comprises a control circuit configured to detect that the current state of the state circuitry is stable, and trigger the transition of the state circuitry to the next state upon detection that the current state of the state circuitry is stable.

Optionally, the state circuitry is configured to provide one or more state indicators to the control circuit, and the control circuit is configured to detect that the current state of the state circuitry is stable using the one or more state indicators.

Optionally, the asynchronous circuit comprises one or more dual rails, each of the one or more state indicators being provided to the control circuit using a dual rail.

Optionally, each of the one or more state indicators is configured to have a first value, a second value or a stability value.

Optionally, at least one of the one or more state indicators having the stability value is indicative of the state circuitry being stable.

Optionally, all of the of the one or more state indicators having the stability value is indicative of the state circuitry being stable.

Optionally, each of the one or more state indicators comprises a first indicator signal and a second indicator signal, and the value of the state indicator is dependent on the first and second indicator signals.

Optionally, each of the one or more state indicators has the first value when the first indicator signal is one and the second indicator signal is zero, the second value when the first indicator signal is zero and the second indicator signal is one, and the stability value when the second indicator signals are both zero.

Optionally, the control circuit comprises a state update circuit configured to trigger the transition of the state circuitry to the next state.

Optionally, the state update circuit is quasi delay insensitive.

Optionally, the state update circuit comprises a plurality of OR gates.

Optionally, the control circuit is configured to provide one or more state update signals to the state circuitry to trigger the transition of the state circuitry to the next state.

Optionally, the asynchronous circuit comprises one or more dual rails, each of the one or more state update signals being provided to the state circuitry using a dual rail.

Optionally, each of the one or more state update signals is configured to have a first value, a second value or a stability value.

Optionally, each of the one or more state update signals comprises a set signal and a reset signal, and the value of the state update signal is dependent on the set signal and the reset signal.

Optionally, the one or more state update signals has the first value when the set signal is one and the reset signal is zero, the second value when the set signal is zero and the reset signal is one, and the stability value when the set signal and the reset signal are both zero.

Optionally, each of the one or more state update signals is configured to provide the stability value to the state circuitry after the first value or the second value has been provided to the state circuitry.

Optionally, the control circuit comprises a selection circuit configured to detect that the current state of the state circuitry is stable, and provide one or more trigger signals, wherein the state update circuit is configured to trigger the transition of the state circuitry to the next state based on the one or more trigger signals.

Optionally, the selection circuit is quasi delay insensitive.

Optionally, the selection circuit comprise one or more C-gates.

Optionally, the control circuit comprises a sanitization circuit configured to receive one or more input signals, receive the one or more trigger signals, and provide one or more sanitized signals to the state update circuit, the one or more sanitized signals being dependent on the one or more input signals and the one or more trigger signals, wherein the state update circuit is configured to trigger the transition of the state circuitry to the next state based on the one or more sanitized signals, and the one or more sanitized signals are persistent signals.

Optionally, the sanitization circuit is quasi delay insensitive.

Optionally, the sanitization circuit comprises one or more mutex elements.

Optionally, the one or more trigger signals and/or the one or more sanitized signals comprise three bits that comprise one or fewer bits having a value of one.

According to a second aspect of the disclosure there is provided a controller for a switching converter, the controller comprising an asynchronous finite state machine circuit comprising state circuitry configured to be in one of a plurality of states, and transition between states, wherein the asynchronous finite state machine is configured to detect that a current state is stable before the state circuitry can transition to a next state.

Optionally, the switching converter comprises one or more power switches, and the state circuitry is configured to provide one or more output signals that are dependent on the state of the state circuitry, the one or more output signals being configured to drive a switching operation of the one or more power switches.

Optionally, the switching converter is a buck converter, a boost converter or a buck-boost converter.

It will be appreciated that the controller of the second aspect may include features set out in the first aspect and can incorporate other features as described herein.

According to a third aspect of the disclosure there is provided a method of operating an asynchronous finite state machine circuit comprising state circuitry configured to be in one of a plurality of states and to transition between states, the method comprising detecting, using the asynchronous finite state machine, that a current state is stable, and transitioning the state circuitry to the next state after having detected that the current state is stable.

It will be appreciated that the method of the third aspect may include features set out in the first and/or second aspects and can incorporate other features as described herein.

BRIEF DESCRIPTION OF THE DRAWINGS

The disclosure is described in further detail below by way of example and with reference to the accompanying drawings, in which.

DETAILED DESCRIPTION

It will be appreciated that a state machine may be referred to as "a finite state machine" to indicate that there are a finite number of states; a synchronous finite state machine receives clock signals as inputs; and "an asynchronous finite state machine" can operate without receiving external clock signals.

Figure 1:
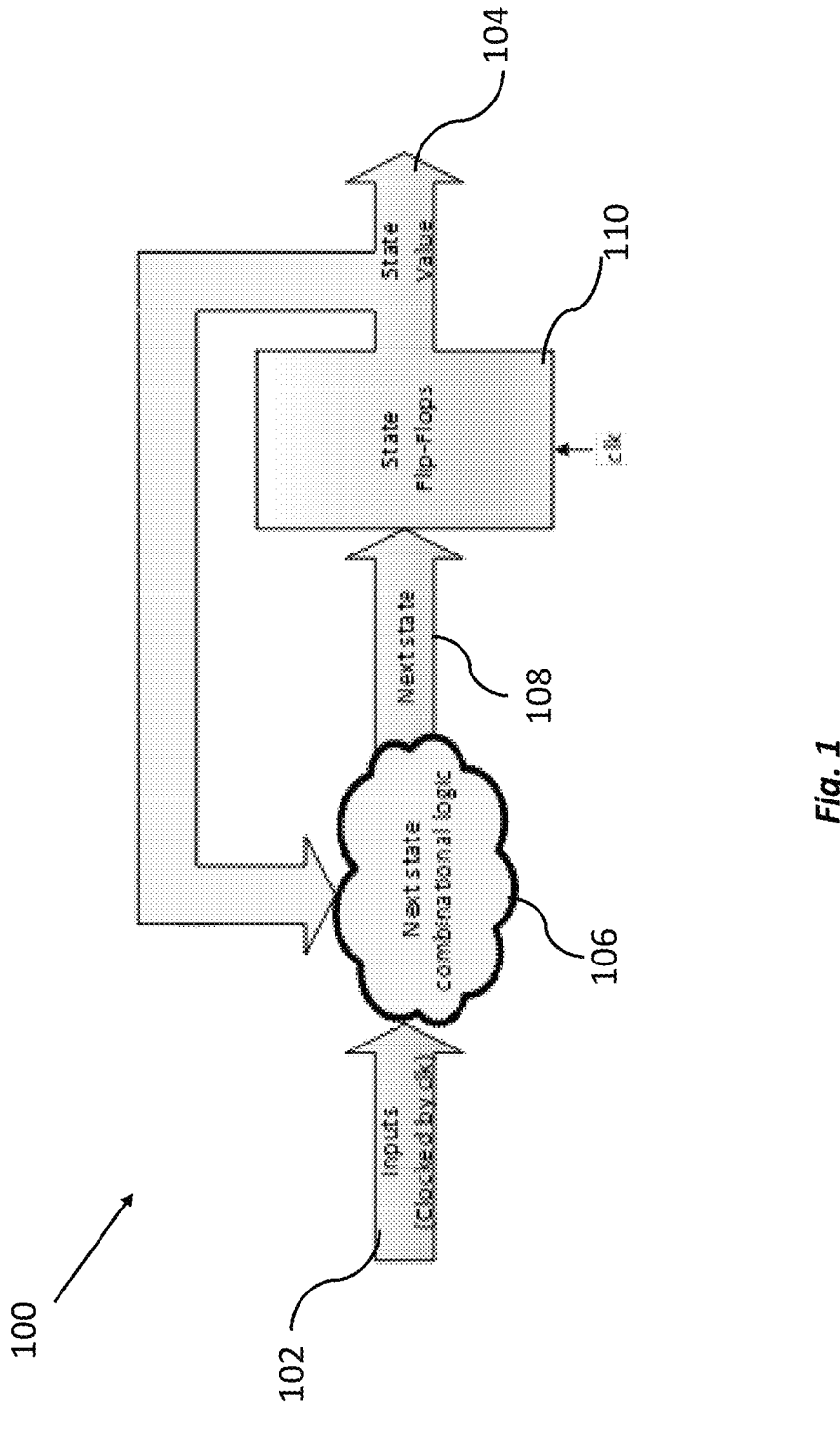
FIG. 1 is a schematic of a synchronous finite state machine circuit.

FIG. 1 is a schematic of a synchronous finite state machine circuit 100. The circuit 100 receives inputs 102 and provides outputs 104. The circuit 100 comprises next state combinational logic 106 for receiving the inputs 102 and the outputs 104 and for providing a next state signal 108. The circuit 100 comprises state flip flops 110 that receive the next state signal 108 and a clock signal clk, with a state transition being triggered by the clock signal clk.

In operation, the clk event causes the state of the state flip flops 110 to update. Changes to the state and inputs 102 cause the next state to be re-calculated before the clk event updates the state again.

Using the circuit 100 requires the state update to wait until it receives the triggering clock event, which would produce a slow design with latency determined by the clock period for a large number of inputs. Asynchronous circuits do not have to wait for a triggering event from a clock to update the state of the circuit.

Figure 2:
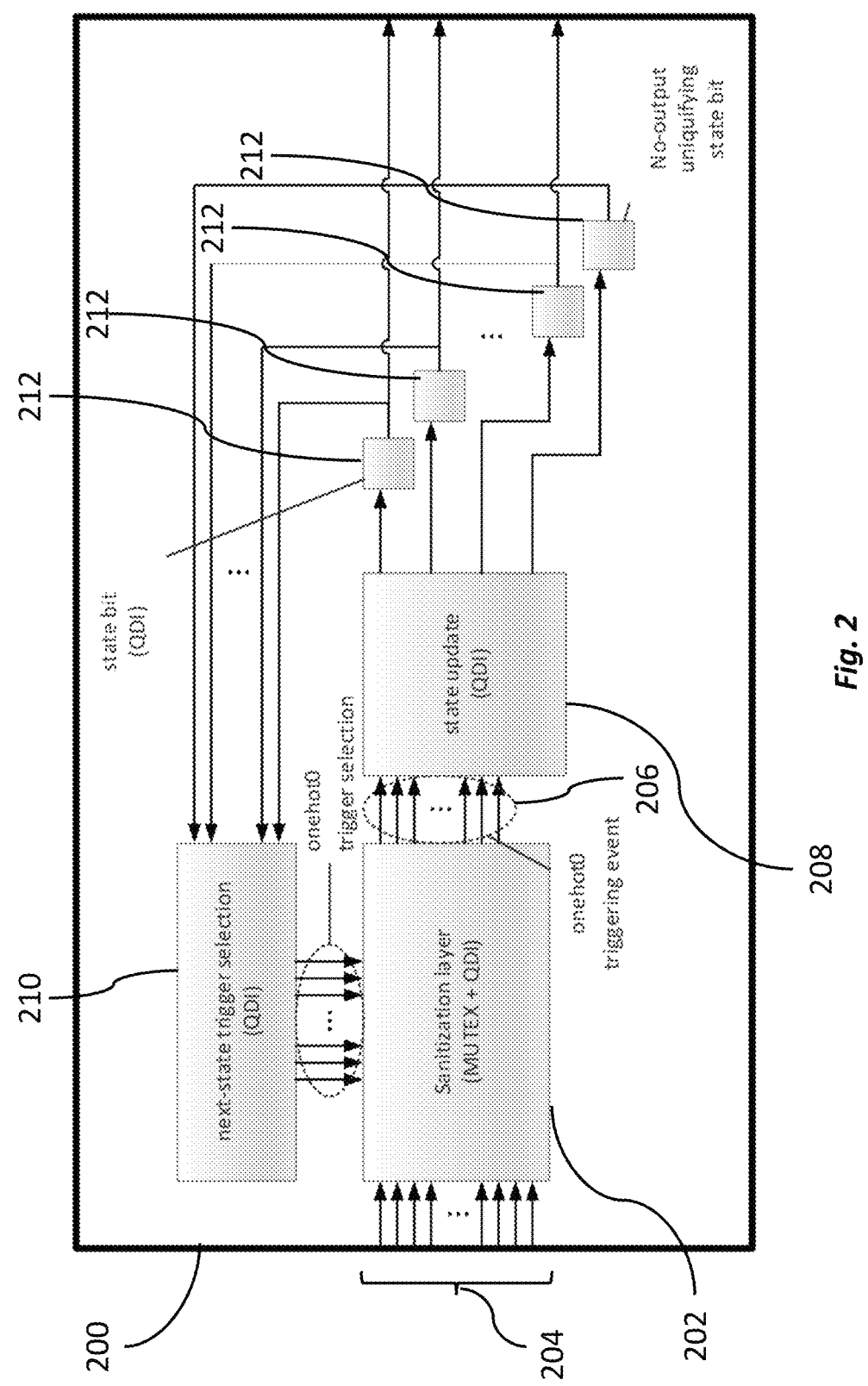
FIG. 2 is a schematic of an asynchronous circuit state machine circuit.

FIG. 2 is a schematic of an asynchronous circuit state machine circuit 200 where the events from the clock, as described in relation to FIG. 1, are substituted by events in a ring structure. The circuit 200 is an example of a design with a large number of interdependent outputs, with the outputs being taken from the state.

The occurrence of non-persistent signals within the circuit 200 can result in hazards, where the circuit 200 operates in an undesired way, for example because of different paths within the circuit 200 resulting in propagation delays that can cause incorrect outputs. Persistent signals ensure well-behaved operation of the circuit 200.

The circuit 200 comprises a sanitization layer 202 that has, at most, one sanitizer enabled. The sanitization layer 202 receives input signal 204 and provides output signals 206 that have been sanitized.

Real world inputs, such as the input signals 204 are rarely well-behaved, and therefore are filtered by the sanitization layer 202. The sanitization layer 202 receives the input signals 204, that may be non-persistent, and sanitizes the input signals 204 to provide output signals 206 that are persistent.

In the present example, the sanitizer implemented within the sanitization layer 202 may, for example, be a WAIT element for a single input signal, or a WAIT/arbiter construct for multiple input signals. The WAIT arbiter construct is configured to pick one of a set of potentially simultaneous events. WAIT elements may be implemented as described at https://workcraft.org/a2a/start and will be well known to the skilled person.

The circuit 200 comprises a state update block 208 that calculates the new state, which is fed back to a next-state trigger selection 210 to change the selected sanitizer. The circuit 200 further comprises state bits 212.

An asynchronous circuit is Quasi Delay-Insensitive (QDI) if it operates correctly even when there are variations in the delay of signals within the circuit. QDI circuits are designed to be insensitive to delays that can occur due to variations in process, voltage, and temperature. Further information may be found here: https://en.wikipedia.org/wiki/Quasi-delay-insensitive circuit The current practice is to divide the design of a QDI asynchronous circuit into two parts.

1. The QDI logic is defined using Signal Transition Graphs (STGs) [https://en.wikipedia.org/wiki/Signal_transition_graphs] and synthesized into a QDI circuit using a tool such as MPSat [https://www.workcraft.org/help/synthesis].

2. The sanitization layer QDI logic requires that the environment within which it sits is compatible with the STG or STGs from which it was derived. This means that the ordering of input signal changes relative to output signal changes must be as specified by the STG or STGs. Real-world inputs are rarely well-behaved so must be filtered by the sanitization layer. The sanitization layer is under control of the QDI logic and turns badly ordered non-persistent inputs into well-ordered persistent signals. An example of this is shown in [https://www.workcraft.org/tutorial/design/hierarchical_buck/start] where the "WAIT*" blocks are the sanitization layer, and the "CYCLE" and "CHARGE" blocks are the QDI logic. The "WAIT*" blocks and other primitives are described in [https://www.workcraft.org/a2a/start] and [V. Khomenko, D. Sokolov, A. Mokhov, A. Yakovlev: "WAITX: an arbiter for non-persistent signals", Proc. Asynchronous Circuits and Systems (ASYNC), 2017]. The QDI logic chooses which signals the sanitization layer is sensitive to. This ensures that only the expected inputs to the QDI logic can change.

Figures 3A, 3B, 3C, 3D, 3E:
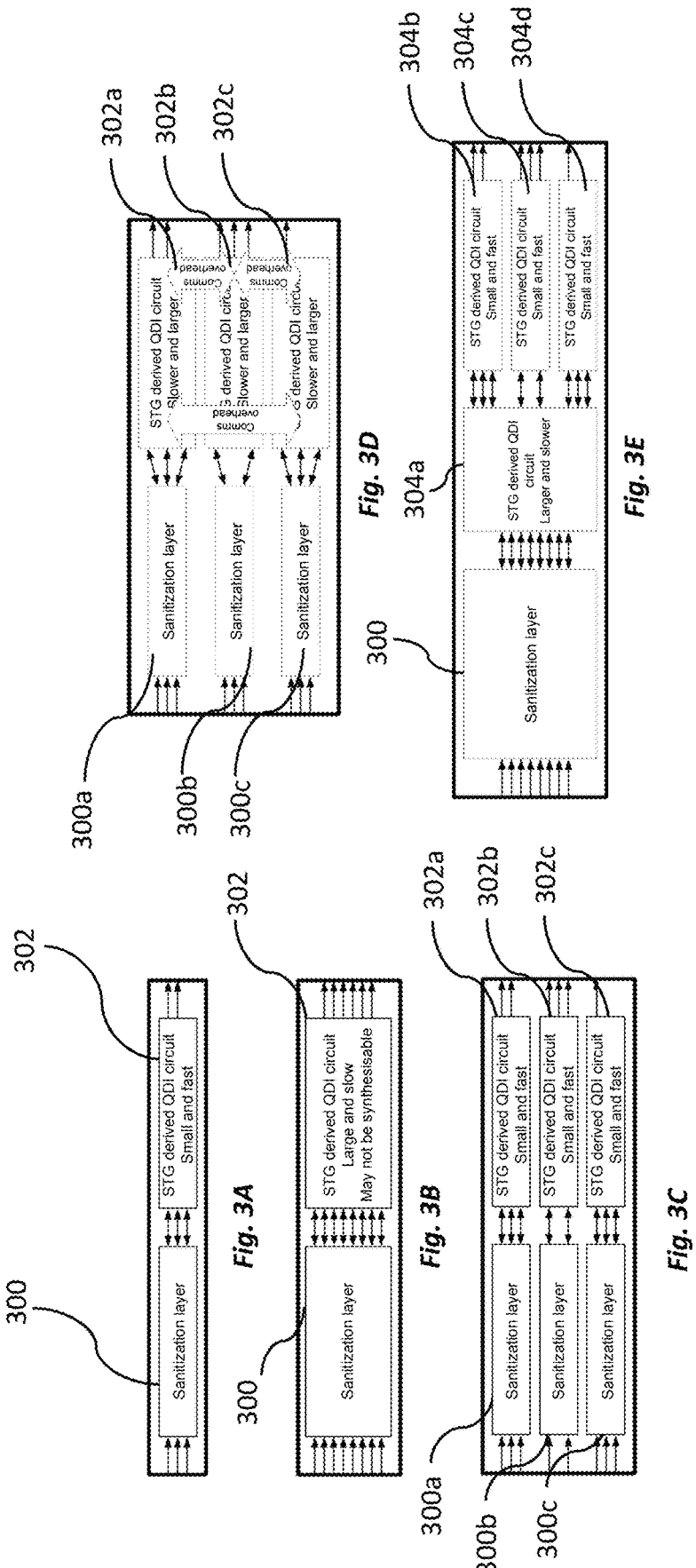
FIG. 3A is a schematic of a sanitization layer coupled to a QDI circuit.
FIG. 3B is a schematic of the sanitization layer coupled to the QDI circuit.
FIG. 3C is a schematic of sanitization layers coupled to QDI circuits.
FIG. 3D is an alternate schematic of the sanitization layers and the QDI circuits as shown in FIG. 3C.
FIG. 3E is a schematic of the sanitization layer and QDI circuits.

FIG. 3A is a schematic of a sanitization layer 300 coupled to a QDI circuit 302. STG derived QDI logic works well when the STG has few input ports and output ports.

FIG. 3B is a schematic of the sanitization layer 300 coupled to the QDI circuit 302, with more input and output ports that presented in the previous example. As the number of ports grows the logic gets large and slow and the synthesis takes an increasingly long time.

This can be mitigated somewhat by decomposing the STGs, and therefore the QDI logic, into smaller, communicating, blocks, as shown in FIG. 3C. FIG. 3C is a schematic of sanitization layers 300a, 300b, 300c coupled to QDI circuits 302a, 302b, 302c, respectively. If there is no communication between the blocks that control each output, then decomposition usually results in a good outcome.

However, if there isn't sufficient independence between the functions for each output then the communication overhead between blocks slows down the logic, as shown in FIG. 3D. FIG. 3D is an alternate schematic of the sanitization layers 300a, 300b, 300c and the QDI circuits 302a, 302b, 302c as shown in FIG. 3C. The QDI blocks also grow due to the logic to handle the communication. Furthermore, there are often (handshake) signals that go directly between the STG's 300a, 300b, and 300c. These have the effect of slowing operational speed due to the extra steps executed in the handshake sequence.

Another decomposition is to have a QDI block which makes the decisions and QDI blocks that drive the outputs, as shown in FIG. 3E. FIG. 3E is a schematic of the sanitization layer 300 and QDI circuits 304a, 304b, 304c, 304d. The decision QDI block is smaller than the monolithic block, but it still has many inputs and outputs, so the gain is small. There is also some communication overhead to the output driver blocks.

It may be possible to analyse the requirements to find underlying structure that will result in fewer QDI blocks with reduced communications. The disadvantage of this is that a small change in the requirements may result in re-starting the analysis and implementation from scratch if the new requirements don't match the structure chosen.

Returning to the circuit 200 of FIG. 2, there are problems with this approach. The state update block 208 and the next-state trigger selection block 210 are QDI blocks and appear to suffer the same problems of too many signals as the other approaches. There is also the problem of completion detection. i.e., the next-state trigger selection block 210 does not have any mechanism to detect when the state bits 212 have stopped changing.

Figures 4A, 4B, 4C, 4D:
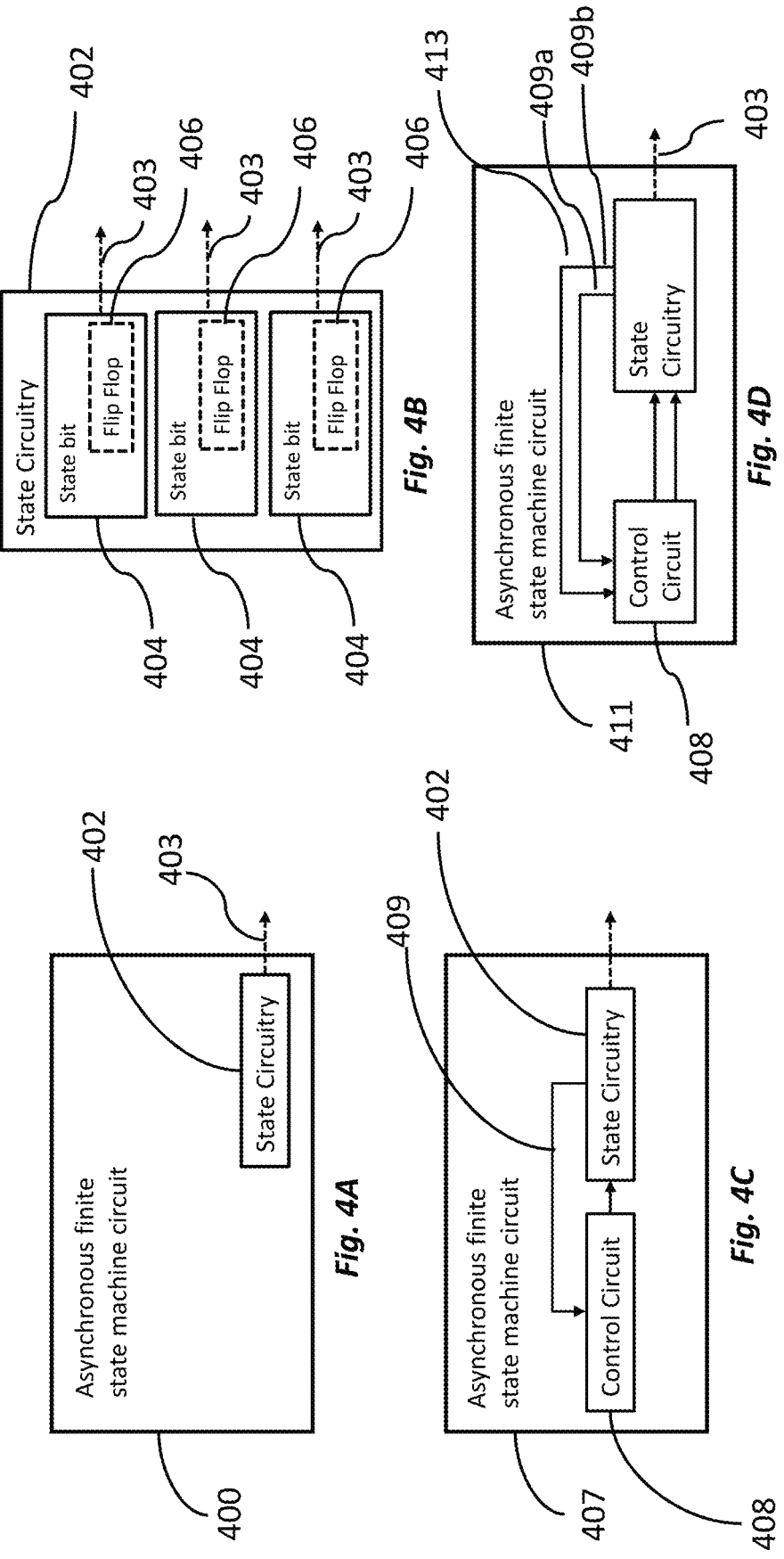
FIG. 4A is a schematic of an asynchronous finite state machine circuit in accordance with a first embodiment of the present disclosure.
FIG. 4B is a schematic of a specific embodiment of the state circuitry.
FIG. 4C is a schematic of an asynchronous finite state machine circuit in accordance with a second embodiment of the present disclosure.
FIG. 4D is a schematic of an asynchronous finite state machine circuit in accordance with a third embodiment of the present disclosure.

FIG. 4A is a schematic of an asynchronous finite state machine circuit 400 in accordance with a first embodiment of the present disclosure. The circuit 400 comprises state circuitry 402 that is configured to be in one of a plurality of states and to transition between those states.

The circuit 400 is configured to detect that a current state is stable before the state circuitry 402 can transition to the next state.

For example, the state circuitry 402 may transition from a first state to a second state over a time period. The circuit 400 may then detect that the transition has ended and with the state circuitry 402 being in the second state and stable. The circuit 400 may then permit a transition to another state, such as from the second state to a third state, or from the second state back to the first state.

In effect, the circuit 400 enables the "completion detection" functionality as previously discussed. This ensures that the circuit 400 will not operate in an unexpected or incorrect way due to a subsequent transition being triggered before the last transition was completed. Therefore, there is provided an improved asynchronous finite state machine circuit that is more robust, and less prone to incorrect operation, than known systems.

The state circuitry 402 may be configured to provide an output signal 403 that is dependent on the state of the circuitry 402.

The architecture of asynchronous finite state machine 400 may be configured as a programmable asynchronous finite state machine in a field programmable gate array style structure.

FIG. 4B is a schematic of a specific embodiment of the state circuitry 402. The state circuitry 402 comprises three state bits 404. In further embodiments, the state circuitry 402 may comprise less than three, or more than three state bits 404. Each state bit 404 may provide an output signal 403 that is dependent on its associated state bit's 404 bit state.

Each of the state bits 404 is configured to be in one of a plurality of bit states. The state of the state circuitry 402 is dependent on the bit states of the one or more state bits 404.

For example, a single state bit 404 may be in one of two bit states, with the first state denoted by 0 and the second state denoted by 1. The bit state of all state bits then may be used to describe the overall state of the state circuitry 402. For example, assuming all state bits 404 have a bit state of 1, the state circuitry 402 may be said to be in a 111 state.

It will be appreciated that the states of the state circuitry 402 may be referred to without reference to the bit values of the state bits 404, and it is simply a matter of naming conventions as may differ across different applications. For example, having all state bits 404 having a 1 value, may result in an external circuit being activated by the output signals 403. Therefore the 111 state, in the present example may be referred to as a "switch on state".

The state bits 404 may comprise a flip-flop 406. A flip-flop is a digital circuit component that can store a single binary value (0 or 1). Flip-flops are typically implemented using electronic components such as transistors. In asynchronous designs, flip-flops are designed to operate without a global clock signal and can change state based on the inputs they receive.

Flip-flops can be implemented in several different configurations, such as but not limited to D flip-flops, JK flip-flops, and T flip-flops, which have different input and output characteristics. In general, flip-flops are used as memory elements in digital circuits, allowing the circuit to store and manipulate binary values over time.

FIG. 4C is a schematic of an asynchronous finite state machine circuit 407 in accordance with a second embodiment of the present disclosure. The circuit 407 comprises a control circuit 408 and the state circuitry 402.

The control circuit 408 is configured to detect the current state of the state circuitry 402 is stable, and to trigger the transition of the state circuitry 402 to the next state upon detection that the current state of the state circuitry 402 is stable.

The state circuitry 402 may be configured to provide a state indicator 409 to the control circuit 408, with the control circuit being configured to detect that the state circuitry 402 is stable using the state indicator 409.

In further embodiments, the state circuitry 402 may be configured to provide two or more state indicators to the control circuit 408 when the control circuit 408 detecting stability using the two or more state indicators.

During operation, the state indicator 409 may have a first value, a second value or a stability value, with the stability value being indicative of the state circuitry 402 being stable.

For example, for a first time period where the state circuitry 402 is transitioning between states, the first value may correspond to a two bit value such as 10, with the 1 denoting the current state of the state circuitry and the 0 denoting the stability status. Once the transition is complete there may be provided a stability value 11, where the first bit denotes the current state, and the second bit denotes that the state circuitry 402 is now stable. In response, a further transition may be triggered by the control circuit 408 resulting in the second value 00 being provided by the state indicator 409 during the transition, and the stability value 01 being provided once stability is achieved. It will be clear to the skilled person that other methods may be used to provide the relevant information using the state indicator 409. For example, rather than binary encoding, the state indicator 409 may denote state and/or stability by different voltage levels or by variation in frequency of a signal 409.

Furthermore, the state indicator 409 may comprise a single signal or may comprise two or more signals, with the "value" provided by the state indicator 409 being dependent on the value or properties of its constituent signals. In the example presented previously, the two bit binary values may each comprise one bit provided by one of two indicator signals and the other bit provided by the other of the two indicator signals. For example, one signal can provide information on the state, and the other can provide information on the stability status.

FIG. 4D is a schematic of an asynchronous finite state machine circuit 411 in accordance with a third embodiment of the present disclosure. In the present embodiment the circuit 411 comprises a dual rail 413, with the state indicator 409 being provided by the dual rail 413. In the present example, the state indicator 409 comprises an indicator signal 409a and an indicator signal 409b. Further embodiments may comprise two or more dual rails. In further embodiments there may be provided more than two rails for the indicator signals.

Each indicator signal 409a, 409b may function as described previously in relation to the single state indicator 409, and in accordance with the understanding of the skilled person. In further embodiments there may be more than two indicators signals.

In a specific embodiment, where the state circuitry 402 comprises state bits 404, for example as described in relation to FIG. 4B, each state bit may provide an indicator signal to the control circuit 408. A transition may then be triggered once all state bits 404 have reported stability via their respective indicator signals.

Figures 5A, 5B:
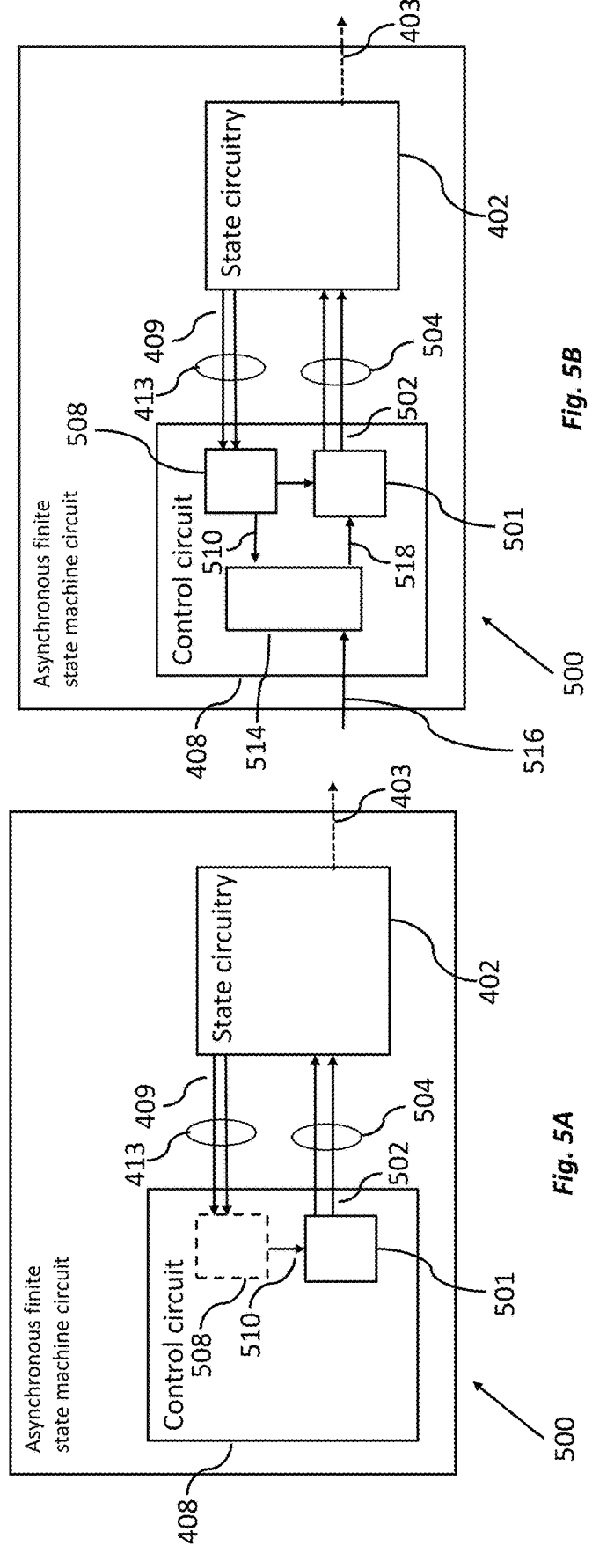
FIG. 5A is a schematic of an asynchronous circuit comprising a specific embodiment of the control circuit in accordance with a fourth embodiment of the present disclosure.
FIG. 5B is a schematic of an asynchronous circuit comprising a specific embodiment of the control circuit in accordance with a fifth embodiment of the present disclosure.

FIG. 5A is a schematic of an asynchronous circuit 500 comprising a specific embodiment of the control circuit 408 in accordance with a fourth embodiment of the present disclosure. The control circuit 408 comprises a state update circuit 501 that is configured to trigger the transition of the state circuitry 402 to the next state. The state update circuit 501 may be quasi delay insensitive (QDI).

The control circuit 408 is configured to provide a state update signal 502 to the state circuitry 402 to trigger the transition of the state circuitry 402 to the next state. In further embodiments the control circuit 408 may provide more than one state update signal.

The circuit 500 comprises a dual rail 504, with the state update signal 502 being provided via the dual rail 504. The state update signal 502 may be encoded as described previously for the state indicator and in accordance with the understanding of the skilled person. For example, the state update signal 502 may have a first value, a second value or a stability value during operation. During operation the state update signal may provide the stability value to the state circuitry 402 after the first value has been provided to the state circuitry 402. The state update signal 502 may comprise a set signal and a reset signal, with the value of the state update signal being dependent on the set and reset signals.

The circuit 500 may comprise a selection circuit 508. The selection circuit 508 is configured to detect that the current state of the state circuitry 402 is stable and provide one or more trigger signals 510. The state update circuit 501 is configured to trigger the transition of the state circuitry 402 to the next state based on the one or more trigger signals 510. The selection circuit 508 is quasi delay insensitive.

FIG. 5B is a schematic of an asynchronous circuit 512 comprising a specific embodiment of the control circuit 408 in accordance with a fifth embodiment of the present disclosure. The control circuit 408 comprises a sanitization circuit 514 configured to receive one or more input signals 516, receive the one or more trigger signals 510 and provide one or more sanitized signals 518 to the state update circuit 501. The one or more sanitized signals 518 are dependent on the one or more input signals 516 and the one or more trigger signals 510

The state update circuit 501 is configured to trigger the transition of the state circuitry 402 to the next state based on the one or more sanitized signals 518. As discussed previously in relation to the sanitization process, the sanitizer functions to sanitize the signals. Therefore, the one or more sanitized signals 518 are persistent signals. The sanitization circuit 514 may be quasi delay insensitive.

The one or more trigger signals 510 and/or the one or more sanitized signals 518 may comprise three bits that comprise one or fewer bits having a value of one. This may be referred to as "Onehot0". Onehot0 means that no more than one bit is set. As in, 001, 010, 100 are the only legal values for a 3-bit field. 000 is not a valid state, but instead may function as a spacer to avoid multiple states being presented at the same time.

Figure 6:
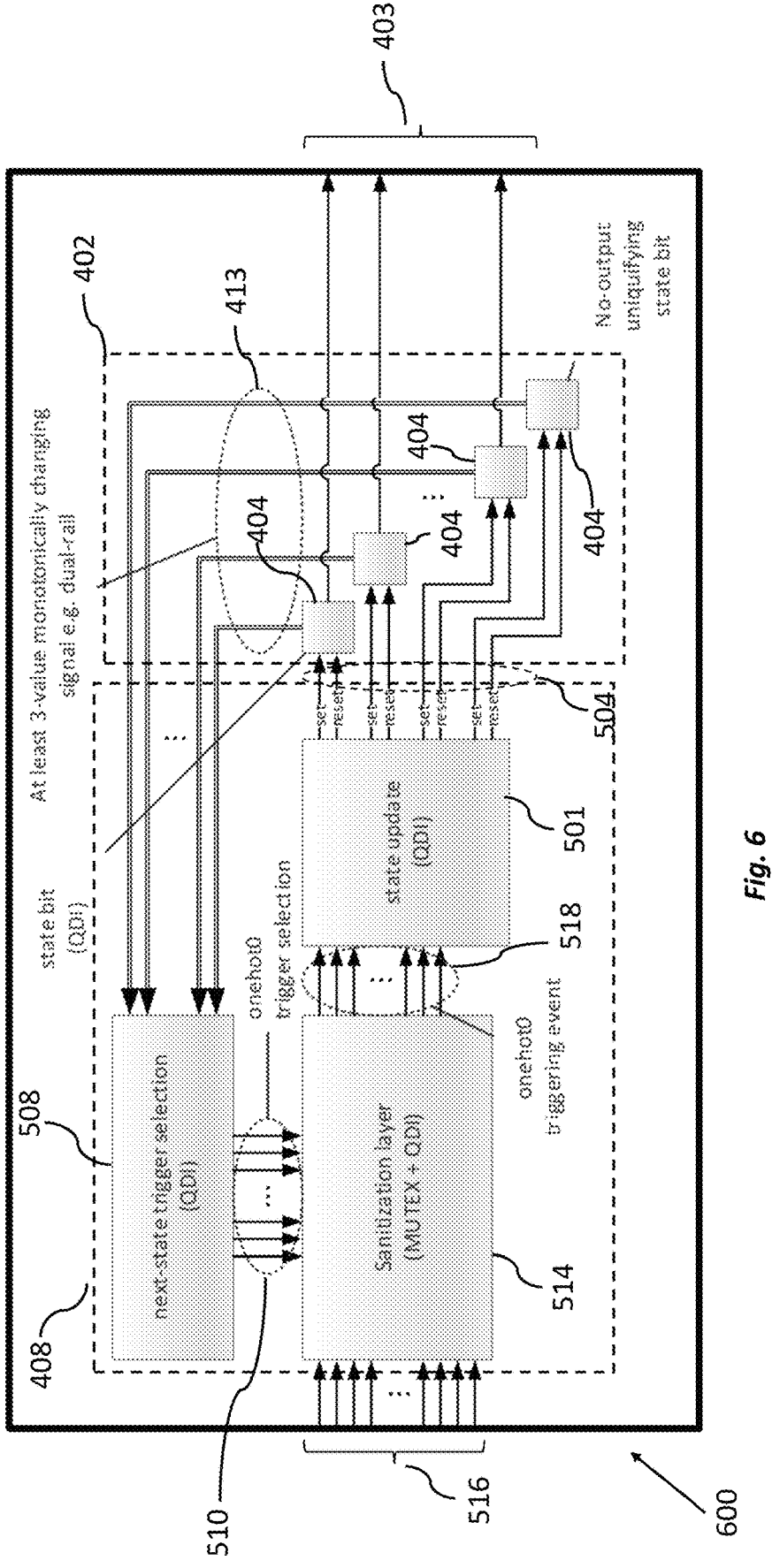
FIG. 6 is a schematic of an asynchronous circuit in accordance with a sixth embodiment of the present disclosure.

FIG. 6 is a schematic of an asynchronous circuit 600 in accordance with a sixth embodiment of the present disclosure. The circuit 600 is quasi delay insensitive and can provide low latency from input triggers to a change to some, or all, of a large number of outputs without timing assumptions.

In the present embodiment, the completion detection problem is solved using monotonic codes to represent the state. These codes feature a "spacer" value which serves as an explicit separator between the "0" and "1" values of the signal-switching between "0" and "1" always goes through "spacer". The "spacer" functions as the stability value, as discussed previously. The spacer indicates that the state is "stable" and is ready to be updated.

For example, dual-rail encoding can be used where "false" asserted means 0, "true" asserted means 1 and "false" and "true" de-asserted, or "spacer", means stable. All state bits 404 report that there is a change happening even if they are not changing themselves. To achieve this the state bits receive set/reset from the "state update" block 501. The set/reset is equivalent to dual rail in that set and reset both de-asserted is a "spacer".

The operation of the circuit 600 may be summarised as follows:

1. The "next-state trigger selection" block 501 selects which signals will cause a triggering event by sending a onehot0 select to the "Sanitization layer" 514.
2. When a triggering event is received on the inputs the "Sanitization layer" 514 generates a onehot0 "triggered" signal. The "triggered" signal implicitly encodes the next state.
3. The "state update" block 501 converts the "triggered" signal to set and reset for each state bit 404.
4. Each "state bit" 404 updates its state so that the output 403 changes if necessary.
5. Each "state bit" 404 signals that its output is now "stable".
6. When all "state bits" 404 have indicated that they are stable the "next-state trigger selection" block 508 deselects the current sanitization block within "Sanitization layer" 514.
7. The sanitization block stops signaling the event.
8. The "state update" block 501 removes the set and reset indicating that "next-state trigger selection" 508 is awaiting the current state.
9. The state bits 404 now signal their new value to the "next-state trigger selection" block 508.
10. The "next-state trigger selection" block 508 selects new signals that will cause a triggering event.

In the present embodiment, as all signaling is either onehot0 or dual rail there is no ambiguity as to whether the multiple signals have all settled.

In the present embodiment, the state bits 404 have dual-rail internal outputs, and single-rail outputs to the outside world. The state bits 404 are small and simple.

In the present embodiment, the next state trigger selection 508 has dual rail inputs, one-hot outputs and has wide, but not deep, gates.

In the present embodiment, the sanitization layer 514 provides sanitization and arbitration using MUTEX elements. It also provides direct mapping of event to a next state or QDI encoding where separate events cause the same next state.

In the present embodiment, the state update 501 has wide, but not, deep gates.

In the present embodiment, the loop delay is small, the function is defined by wiring, and the related STGs are simple and fast. Implementation, modification and debugging is simple.

Figure 7:
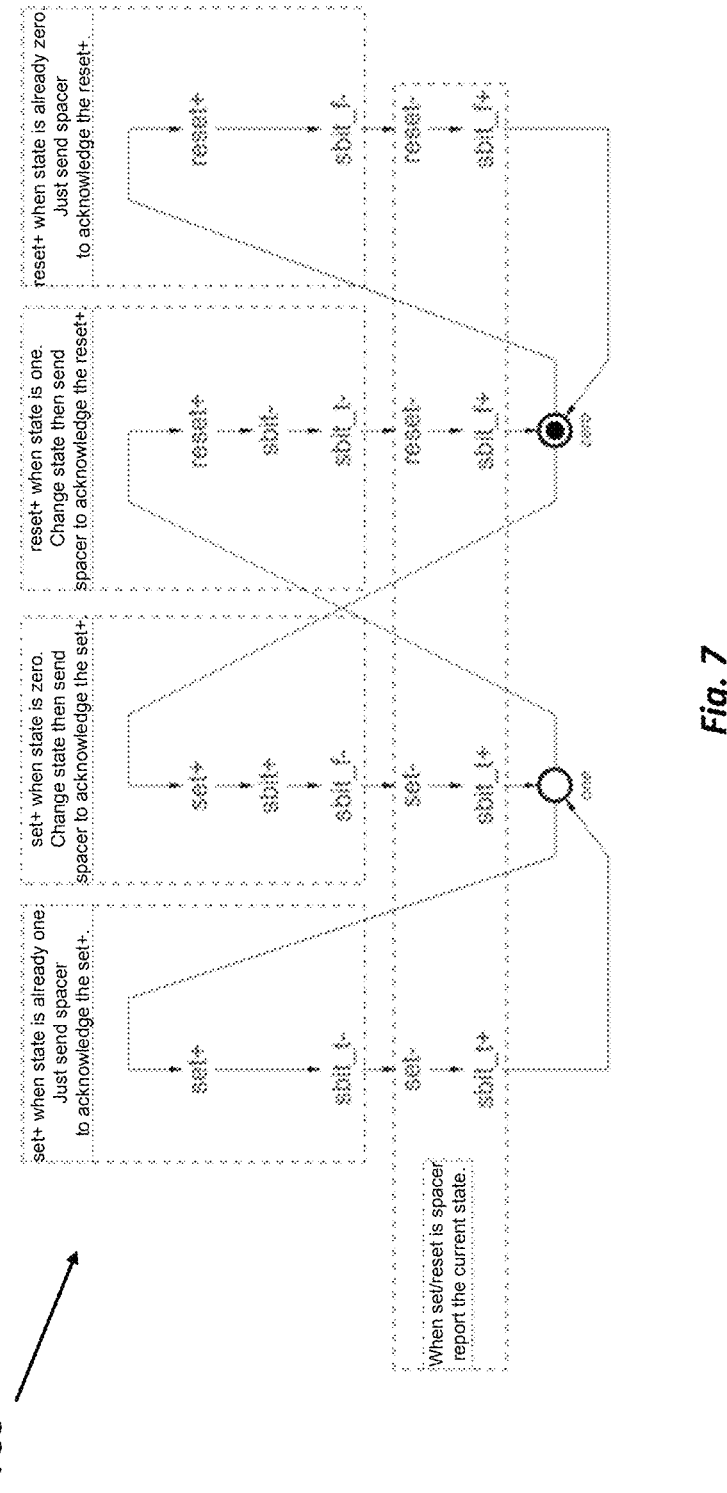
FIG. 7 is a signal transition graph (STG) of a state bit using dual rail encoding to report its state.

FIG. 7 is a signal transition graph (STG) 700 of a state bit using dual rail encoding to report its state. The state bit may, for example, be one of the state bits 404 as described previously.

The sequence is as follows:

1. The "state bit" acknowledges set+ or reset+ by setting the dual rail output to "spacer" (sbit_t==0 and sbit_f==0) indicating to the "next-state trigger selection" block that the state is stable.
2. Eventually the "spacer" will be acknowledged by either set− or reset−.
3. The set− or reset− is acknowledged by reporting the current state.
4. Eventually a new set+ or reset+ re-starts the sequence.

Figure 8:
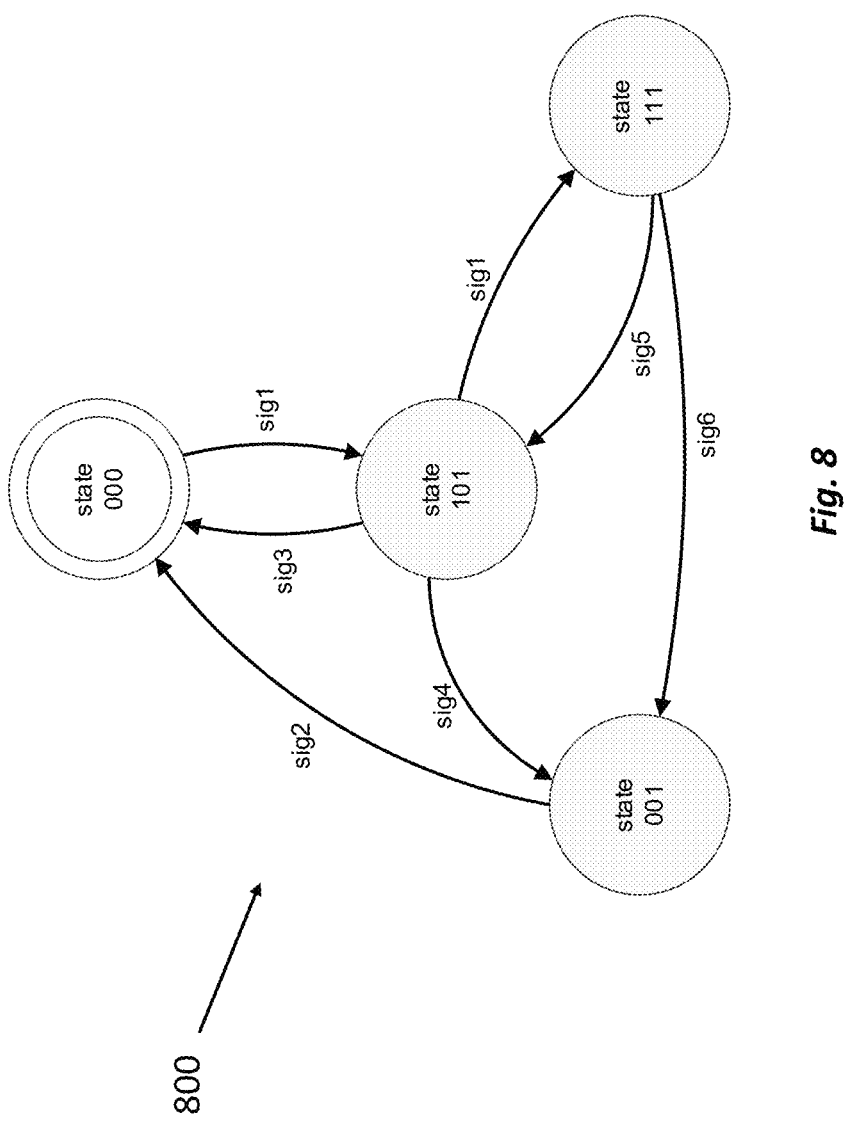
FIG. 8 is a schematic showing a state machine using onehot0 and dual-rail encoding.

FIG. 8 is a schematic showing a state machine 800 using onehot0 and dual-rail encoding, as is the case for the circuit 600.

The state machine 800 comprises a 000 state, a 001 state, 101 state and a 111 state. Each of the states is coupled to another state by an arc. An arc is used to denote a transition process under which a state machine transitions from one of the states to another state.

It may be erroneously assumed that for the present disclosure the state update block 501 and the next state trigger selection block 508 would suffer from the same problems as described previously in relation to FIG. 3A-3D due to the large number of input signals received by these components.

However, due to the onehot0 and dual-rail architectures these problems do not arise as it is not necessary that all states are used, as shown by the state machine 800.

Figure 9A:
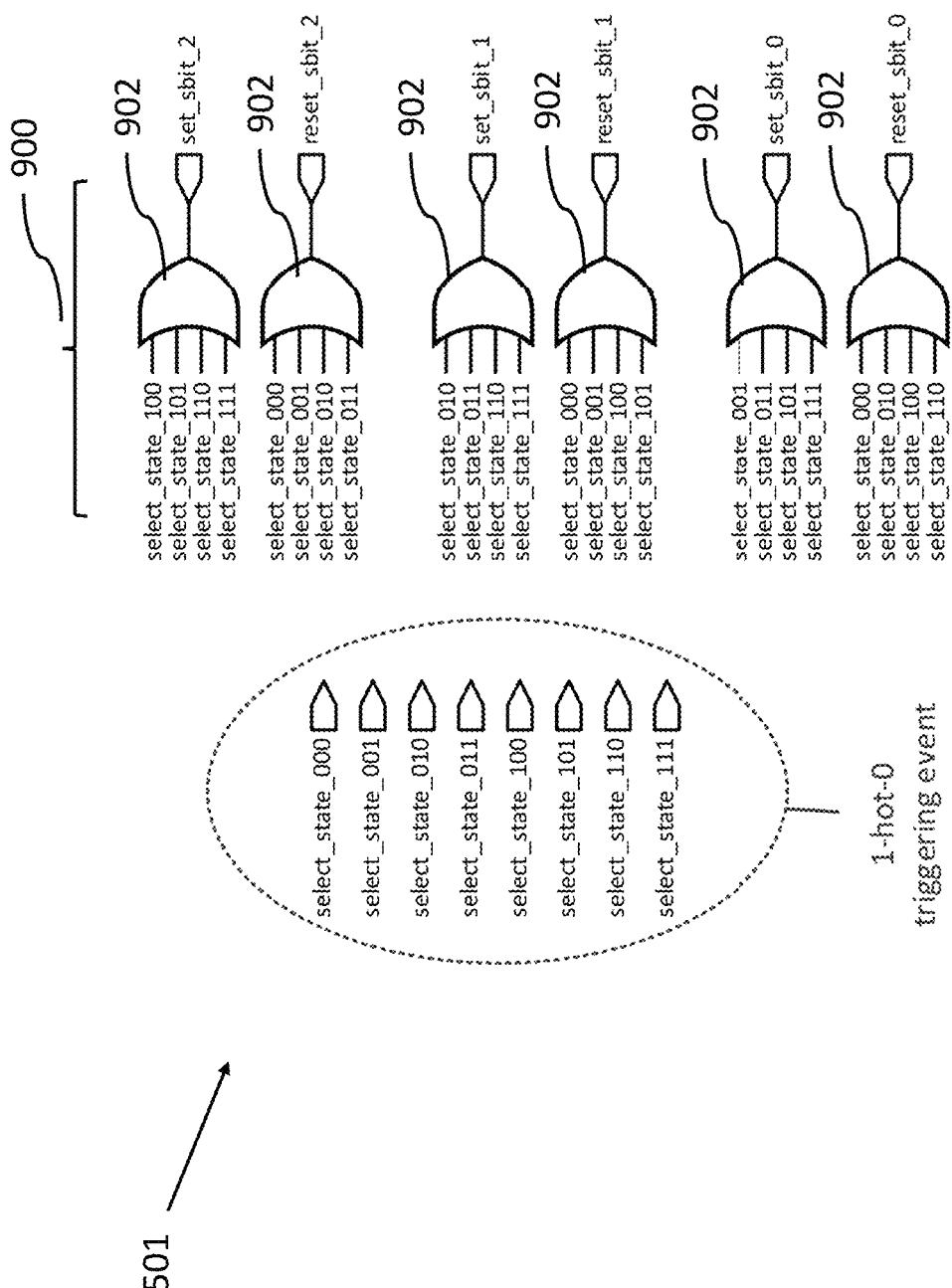
FIG. 9A is a schematic of a specific embodiment of the state update circuit.

FIG. 9A is a schematic of a specific embodiment 900 of the state update circuit 501. In the present embodiment, the state update circuit 501 comprises OR gates 902.

In the "state update" block 501 the set and reset calculations may be wide OR gates. The triggering signal implicitly encodes the next state so the appropriate set or reset will be activated.

Figure 9B:
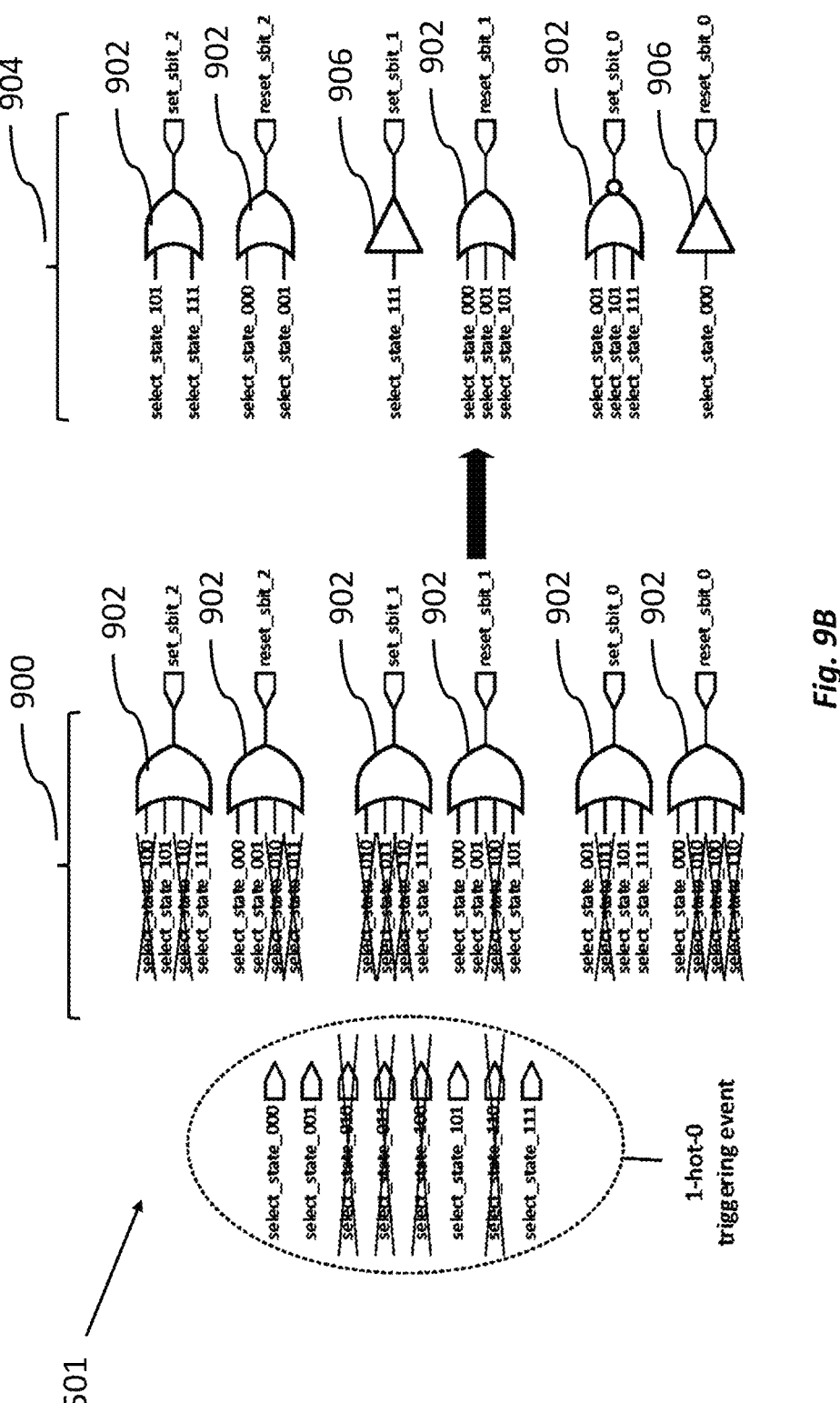
FIG. 9B is a schematic of an alternative specific embodiment of the state update circuit.

FIG. 9B is a schematic of an alternative specific embodiment 904 of the state update circuit 501 comprises OR gates 900 and inverters 906. When all states are not used, some of the OR gates can get smaller as shown in FIG. 9B. If there are many outputs and therefore many state bits, it is likely that most of the states will be unused.

Figure 9C:
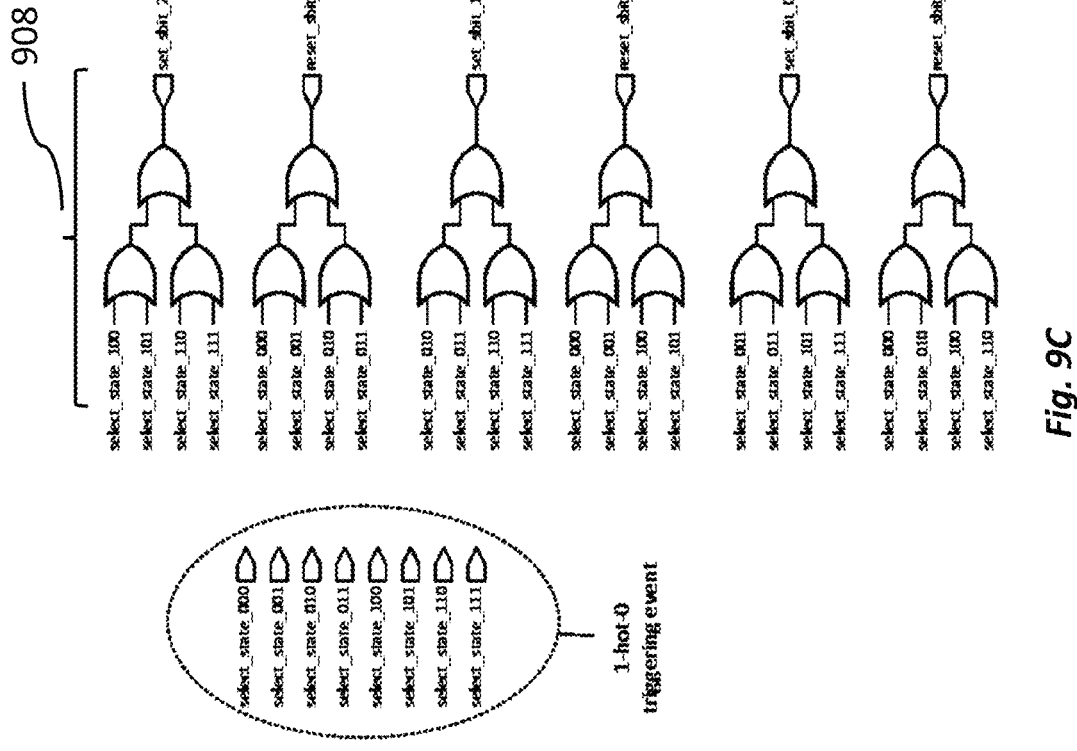
FIG. 9C is a schematic of a further specific embodiment of the state update circuit.

FIG. 9C is a schematic of a further specific embodiment 908 of the state update circuit 501. Due to the function being OR and onehot0 triggering, the OR gates do not need to be monolithic.

Figures 10A, 10B:
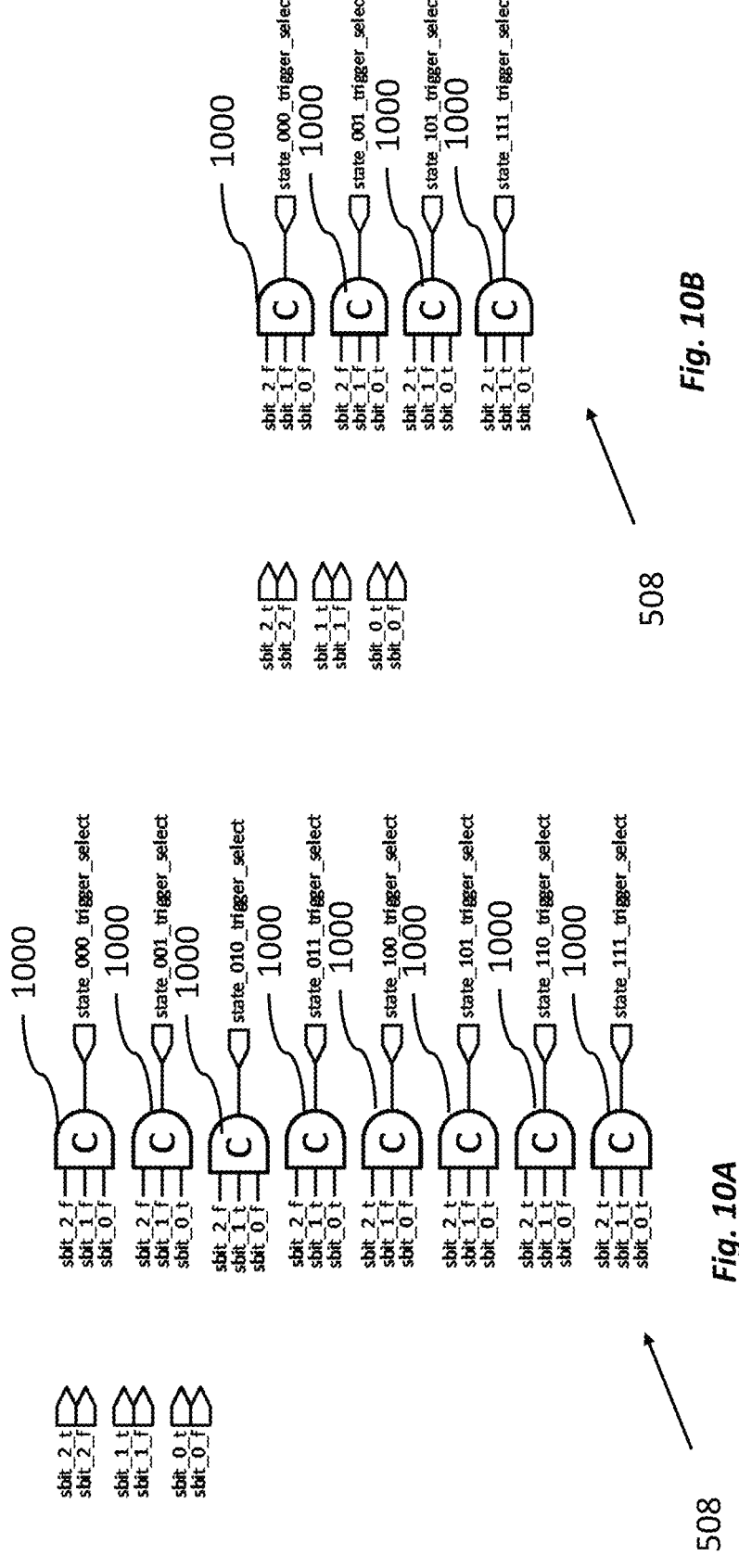
FIG. 10A is a schematic of a specific embodiment of the selection circuit comprising c-gates.
FIG. 10B is a schematic of an alternative embodiment of the selection circuit comprising c-gates.

FIG. 10A is a schematic of a specific embodiment of the selection circuit 508 comprising c-gates 1000 [https:// en.wikipedia.org/wiki/C-element]. In the "next_state trigger selection" block 508 there may be one n-input C-gate per state used where n is the number of state bits 404.

The "next_state trigger selection" 508 block for the present embodiment receives a unique combination of "_t" and "_f" signals from the state bits 404.

FIG. 10B is a schematic of an alternative embodiment of the selection circuit 508 comprising c-gates 1000. Each C-gate 1000 sets when the state represented by its combination is selected. When the dual-rail value goes through "spacer" ("_t"=0 and "_f"=0) the C-gate 1000 resets. As the combinations are unique, at most one C-gate 1000 at a time will be set making the state triggers onehot0. Implementing the state machine 800 as shown in FIG. 8 results in the present embodiment.

Figure 11:
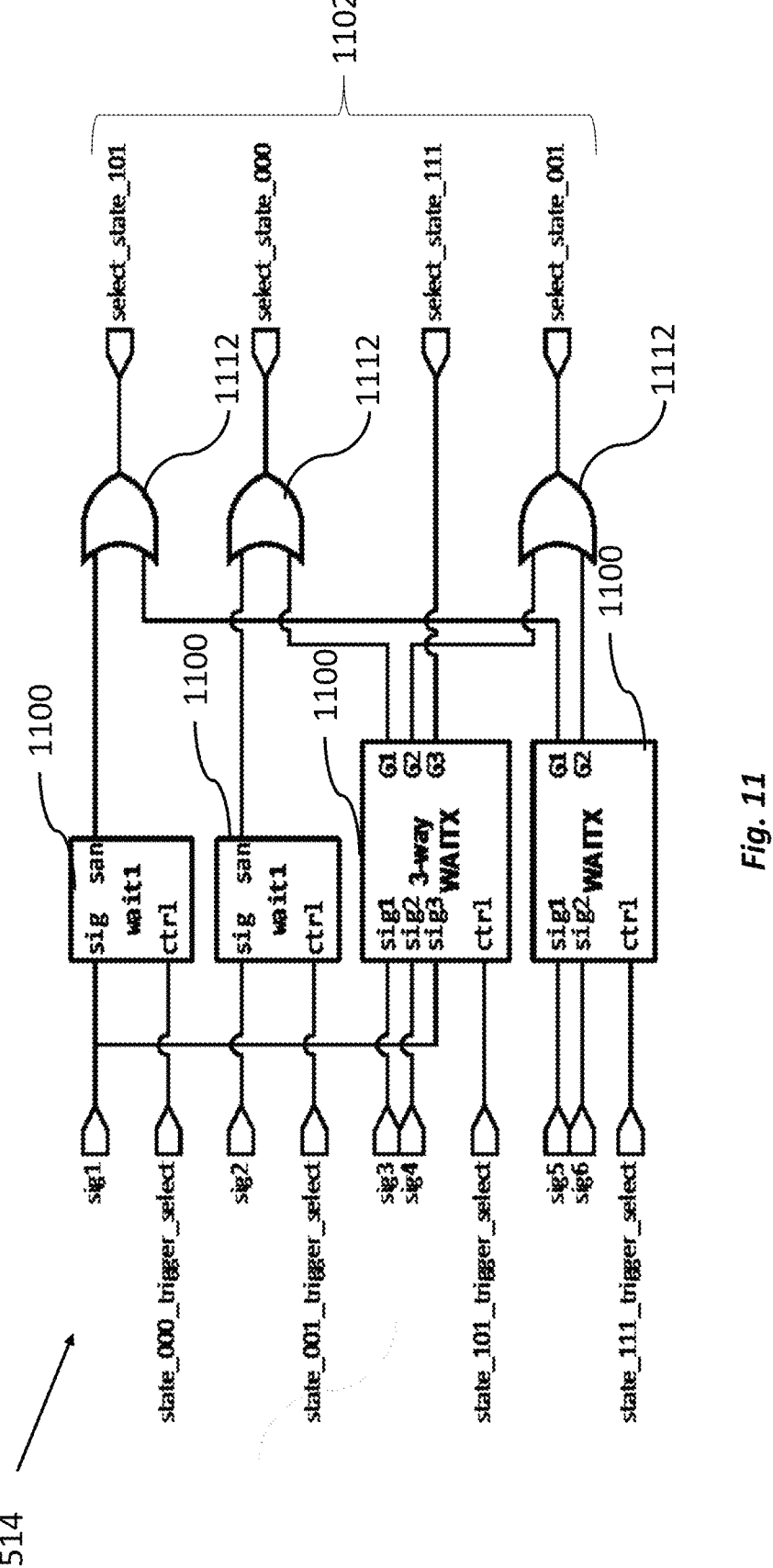
FIG. 11 is a schematic of a specific embodiment of the sanitization circuit.

FIG. 11 is a schematic of a specific embodiment of the sanitization circuit 514. The sanitization circuit 514 comprises MUTEX elements 1100 and OR gates 1112.

The sanitization layer 514 cleans up and, if necessary, arbitrates between inputs. For this it may use the primitives described in https://www.workcraft.org/a2a/start and V. Khomenko, D. Sokolov, A. Mokhov, A. Yakovlev: "WAITX: an arbiter for non-persistent signals", Proc. Asynchronous Circuits and Systems (ASYNC), 2017. The inputs that are sensitive are decided by which state_*_trigger select input is high.

The state transitions are also decided here by which select_state_*output goes high. Only 4 out of the 8 possible states are used here corresponding to the state machine 800.

In the present embodiment, the sanitization layer 514 decides the state transitions. The other blocks only know about the used states.

Further embodiments may be provided by introducing one or more of the following variations to the embodiments as described herein:

This architecture lends itself to a programmable asynchronous finite state machine in an FPGA style structure.

Fixed function arbiters, state-bits, and C-gates connected with programmable routing, "AND", and "OR" gates.

For some architectures it is possible that some output state-bits could be ignored by the next-state calculation. Analysis of common functions could reduce the state size.

Only useful if the multiple outputs of the S-bits could be used to derive the outputs of the block.

The outputs could be latched. A matched delay enable could be generated. This would hide any intermediate settling transitions.

Alternatively, could use dual-rail for the outputs, dual-rail decode logic and latching dual-rail to single-rail converters.

Arbiters that have identical inputs can be shared if the following is done:

Trigger selectors used to enable identical arbiters are OR'd together with the resulting output being the new trigger selector for the common arbiter.

C-gates are used on the arbiter outputs to steer each output to the appropriate destination SBIT set or reset.

One input of the C-gate comes from the original trigger selector.

The other input of the C-gate comes from one of the common arbiter's outputs.

The output of the C-gate goes to the same set/reset lines that the original arbiter output for the original trigger selector went to.

This is repeated for each original trigger selector and each original arbiter.

Figure 12A:
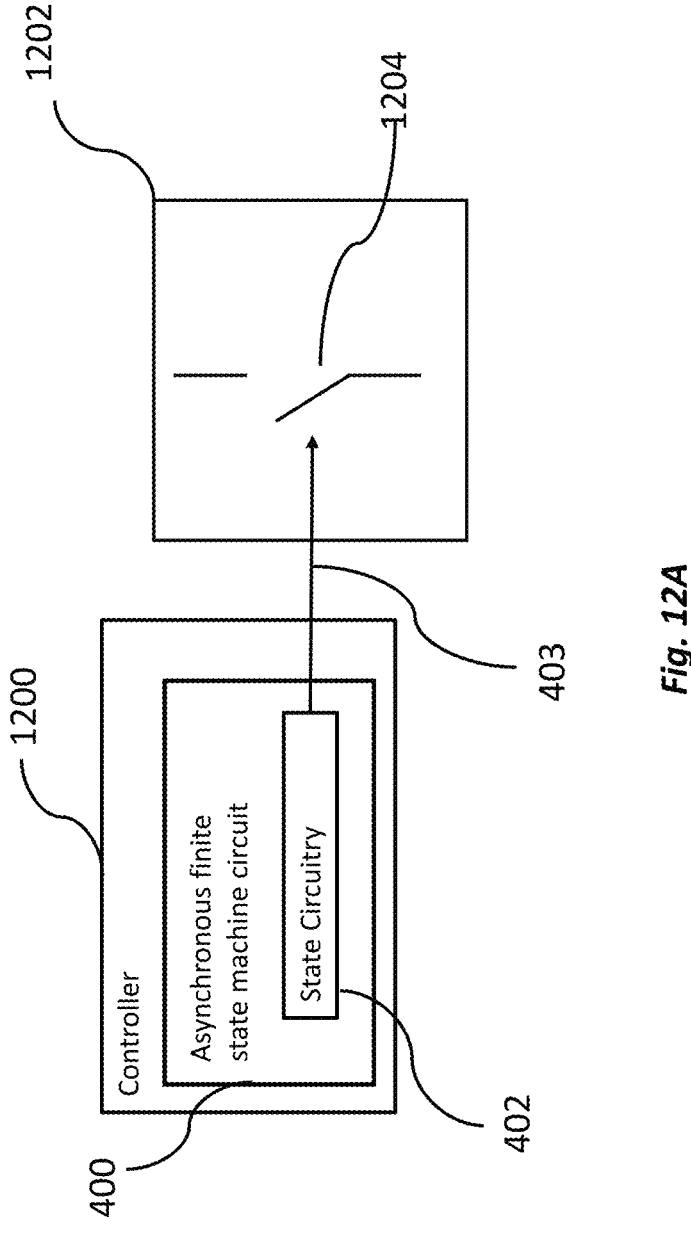
FIG. 12A is a schematic of a controller for a switching converter, in accordance with a seventh embodiment of the present disclosure.

FIG. 12A is a schematic of a controller 1200 for a switching converter 1202, in accordance with a seventh embodiment of the present disclosure. In the present embodiment the controller 1200 comprises the circuit 400. However, in further embodiments, the controller 1200 may comprise any of the asynchronous finite state machine circuits as described herein and in accordance with the understanding of the skilled person.

The switching converter 1202 comprises a power switch 1204, and the state circuitry 402 The output signal 403 is used to drive the switching of the power switch 1204. In further embodiments, the switching converter 1202 may be a buck converter, a boost converter or a buck-boost converter.

Figure 12B:
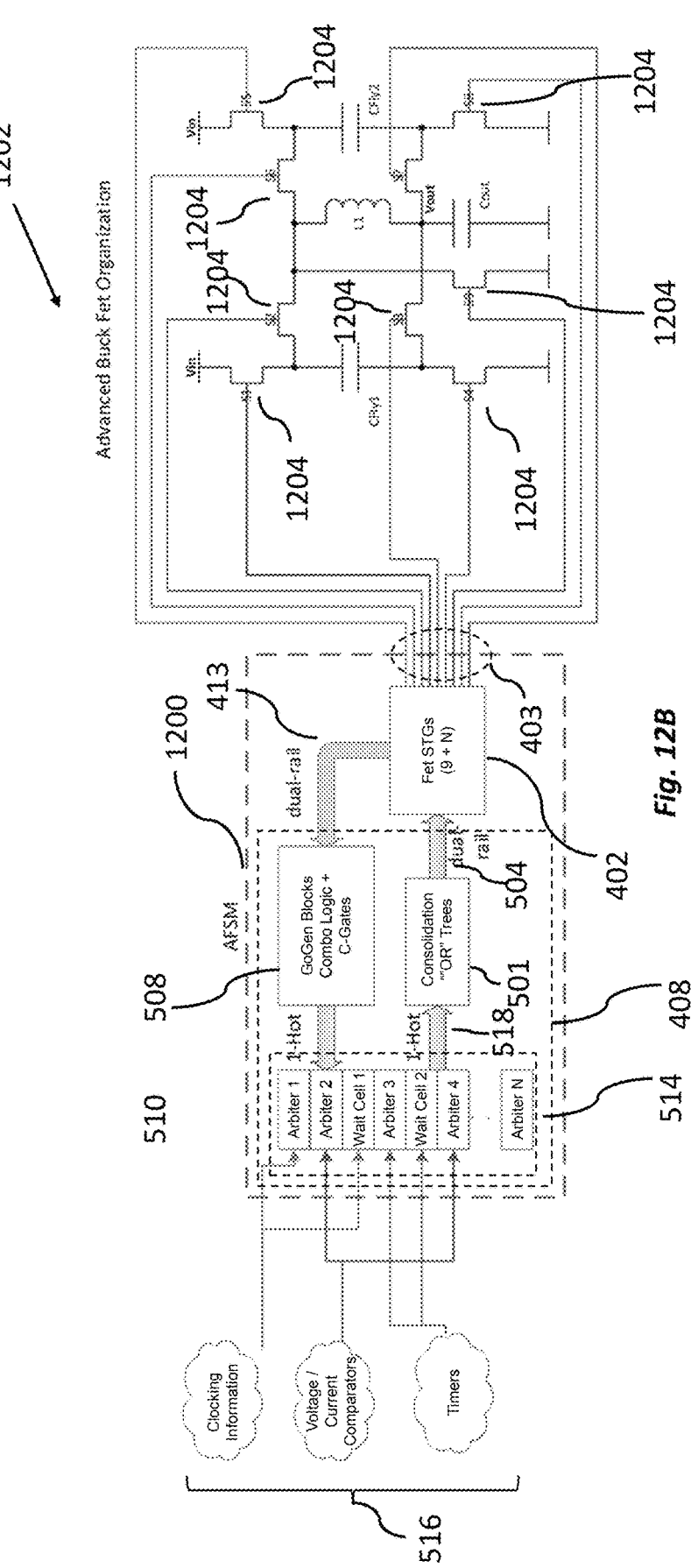
FIG. 12B is a schematic of the controller and the switching converter, in accordance with an eighth embodiment of the present disclosure.

FIG. 12B is a schematic of the controller 1200 and the switching converter 1202, showing specific embodiments of the controller 1200 and the switching converter 1204, and in accordance with an eighth embodiment of the present disclosure.

In the present embodiment the sanitization circuit 514 comprises arbiters (Arbiter 1, Arbiter 2, Arbiter 3, Arbiter 4, Arbiter N) and wait cells (Wait Cell 1, Wait Cell 2). In the present embodiment the power converter 1204 comprises capacitors (CFly1, Cout, CFly2) and an inductor (L1).

Various asynchronous digital signals from a large variety of analog and digital sources are generated and fed into the asynchronous finite state machine of the controller 1200 (as shown by input signals 516).

There are many arbiters in the sanitization circuit 514, and most arbiters have a large number of inputs to arbitrate between (usually 6-8 inputs per arbiter).

The asynchronous finite state machine circuit within the controller 1200 processes the incoming signals 516 and will move to the next state based on: the current state (which enables one and only one arbiter); which arbiter input won arbitration; and the connectivity determined by the Consolidation OR Trees and GoGen Block decode.

There is no timing relationship required between these inputs nor between an input and anything occurring in the asynchronous finite state machine. This includes inputs that may actually be clocks—The asynchronous finite state machine views all inputs as asynchronous.

The outputs of the FET STG blocks (the state circuitry 402) go to the power FETs (power switches 1204) to switch in the sequence determined by the inputs and the asynchronous finite state machine itself.

The asynchronous finite state machine response is extremely fast; requires no internal clock; and requires no synchronization of any kind. Furthermore the controller 1200 implementing the asynchronous finite state machine is low power.

Various improvements and modifications may be made to the above without departing from the scope of the disclosure.

The invention claimed is:

1. An asynchronous finite state machine circuit comprising:

state circuitry configured to:
   i) be in one of a plurality of states; and
   ii) transition between the plurality of states; and
a control circuit configured to:
   detect that a current state of the state circuitry is stable before the state circuitry can transition to a next state; and trigger the transition of the state circuitry to the next state upon detection that the current state of the state circuitry is stable such that state transitions are controlled by completion detection.

2. The asynchronous finite state machine circuit of claim 1, wherein the state circuitry is configured to provide one or more output signals that are dependent on a state of the state circuitry.

3. The asynchronous finite state machine circuit of claim 1, wherein:
  the state circuitry comprises one or more state bits; and
  each of the one or more state bits is configured to be in one of a plurality of bit states, a state of the state circuitry being dependent on the bit states of the one or more state bits.

4. The asynchronous finite state machine circuit of claim 1, wherein:
  the state circuitry is configured to provide one or more state indicators to the control circuit; and
  the control circuit is configured to detect that the current state of the state circuitry is stable using the one or more state indicators.

5. The asynchronous finite state machine circuit of claim 4 comprising one or more dual rails, each of the one or more state indicators being provided to the control circuit using a dual rail.

6. The asynchronous finite state machine circuit of claim 4, wherein each of the one or more state indicators is configured to have a first value, a second value or a stability value.

7. The asynchronous finite state machine circuit of claim 6, wherein at least one of the one or more state indicators having the stability value is indicative of the state circuitry being stable.

8. The asynchronous finite state machine circuit of claim 6, wherein all of the of the one or more state indicators having the stability value is indicative of the state circuitry being stable.

9. The asynchronous finite state machine circuit of claim 6 wherein:
  each of the one or more state indicators comprises a first indicator signal and a second indicator signal; and
  the value of the state indicator is dependent on the first and second indicator signals.

10. The asynchronous finite state machine circuit of claim 9, wherein each of the one or more state indicators has:
  the first value when the first indicator signal is one and the second indicator signal is zero;
  the second value when the first indicator signal is zero and the second indicator signal is one; and
  the stability value when the second indicator signals are both zero.

11. The asynchronous finite state machine circuit of claim 1, wherein the control circuit comprises a state update circuit configured to trigger the transition of the state circuitry to the next state.

12. The asynchronous finite state machine circuit of claim 11, wherein the state update circuit is quasi delay insensitive.

13. The asynchronous finite state machine circuit of claim 11, wherein the control circuit is configured to provide one or more state update signals to the state circuitry to trigger the transition of the state circuitry to the next state.

14. The asynchronous finite state machine circuit of claim 13 comprising one or more dual rails, each of the one or more state update signals being provided to the state circuitry using a dual rail.

15. The asynchronous finite state machine circuit of claim 13, wherein each of the one or more state update signals is configured to have a first value, a second value or a stability value.

16. The asynchronous finite state machine circuit of claim 15, wherein:
  each of the one or more state update signals comprises a set signal and a reset signal; and
  the value of the state update signal is dependent on the set signal and the reset signal.

17. The asynchronous finite state machine circuit of claim 16, wherein the one or more state update signals has:
  the first value when the set signal is one and the reset signal is zero;
  the second value when the set signal is zero and the reset signal is one; and
  the stability value when the set signal and the reset signal are both zero.

18. The asynchronous finite state machine circuit of claim 13, wherein each of the one or more state update signals is configured to provide a stability value to the state circuitry after a first value or a second value has been provided to the state circuitry.

19. The asynchronous finite state machine circuit of claim 11,
  wherein the control circuit comprises a selection circuit configured to:
    detect that the current state of the state circuitry is stable; and
    provide one or more trigger signals,
  wherein the state update circuit is configured to trigger the transition of the state circuitry to the next state based on the one or more trigger signals.

20. The asynchronous finite state machine circuit of claim 19,
  wherein the control circuit comprises a sanitization circuit configured to:
    receive one or more input signals;
    receive the one or more trigger signals; and
    provide one or more sanitized signals to the state update circuit, the one or more sanitized signals being dependent on the one or more input signals and the one or more trigger signals, and
  wherein:
    the one or more sanitized signals are persistent signals.

21. The asynchronous finite state machine circuit of claim 20, wherein the one or more trigger signals and/or the one or more sanitized signals comprise three bits that comprise one or fewer bits having a value of one.

22. A controller for a switching converter, the controller comprising an asynchronous finite state machine circuit comprising:
  state circuitry configured to:
    i) be in one of a plurality of states; and
    ii) transition between the plurality of states; and
  a control circuit configured to:
    detect that a current state of the state circuitry is stable before the state circuitry can transition to a next state; and
    trigger the transition of the state circuitry to the next state upon detection that the current state of the state circuitry is stable such that state transitions are controlled by completion detection.

23. The controller of claim 22, wherein:
  the switching converter comprises one or more power switches; and the state circuitry is configured to provide one or more output signals that are dependent on the state of the state circuitry, the one or more output signals being configured to drive a switching operation of the one or more power switches.

24. A method of operating an asynchronous finite state machine circuit comprising state circuitry configured to be in one of a plurality of states and to transition between the plurality of states, the method comprising:

detecting, using a control circuit of the asynchronous finite state machine, that a current state of the state circuitry is stable; and triggering, by the control circuit, the transition of the state circuitry to a next state upon detection that the current state of the state circuitry is stable, such that state transitions are controlled by completion detection.

* * * * *